(12) United States Patent
Cighir et al.

(10) Patent No.: US 7,529,552 B2
(45) Date of Patent: May 5, 2009

(54) INTERACTIVE IMAGING FOR CELLULAR PHONES

(75) Inventors: Lucian Cighir, Thornhill (CA); Ihor Petelycky, Toronto (CA); Andrew Opala, Mississauga (CA)

(73) Assignee: ISEE Media Inc., Concord, Ontario (CA)

( * ) Notice: Subject to any disclaimer, the term of this patent is extended or adjusted under 35 U.S.C. 154(b) by 155 days.

(21) Appl. No.: 10/958,727

(22) Filed: Oct. 5, 2004

(65) Prior Publication Data

US 2006/0073853 A1 Apr. 6, 2006

(51) Int. Cl.
*H04W 24/00* (2006.01)

(52) U.S. Cl. .................................. 455/457; 455/566
(58) Field of Classification Search ............ 455/566, 455/414.1, 90.1, 550.1, 556.2, 575.1, 456.1–457, 455/404.1, 404.2; 715/761; 345/179–183, 345/156, 160–161; 701/200, 206–208
See application file for complete search history.

(56) References Cited

U.S. PATENT DOCUMENTS

| | | | |
|---|---|---|---|
| 7,031,728 B2 * | 4/2006 | Beyer, Jr. ................ | 455/456.3 |
| 2002/0021258 A1 * | 2/2002 | Koenig ...................... | 345/1.1 |
| 2002/0173344 A1 | 11/2002 | Cupps et al. | |
| 2004/0110545 A1 * | 6/2004 | Kim ......................... | 455/575.1 |
| 2004/0250220 A1 * | 12/2004 | Kalenius ................... | 715/864 |
| 2005/0120312 A1 * | 6/2005 | Nguyen ..................... | 715/863 |
| 2005/0140778 A1 * | 6/2005 | Kim et al. ................. | 348/14.02 |

OTHER PUBLICATIONS

"Sprint, Online User's Guide, PCS Phone Handspring Treo 300 User Guide", 2000 Sprint Spectrum L.P., http://www.palm.com/us/support/handbooks/treo/treo300_UG.pdf; pp. 5, 7, 12, 24, 83-84, 139-148 "Mapquest Mobile User Guide" http://easyedge.uscc.com/ee_pfs/user_guides/mapquest/mapquest.shtml; Jun. 8, 2004; pp. 1-9.

* cited by examiner

*Primary Examiner*—Alexander Eisen
*Assistant Examiner*—Anthony S Addy
(74) *Attorney, Agent, or Firm*—Greer, Burns & Crain, Ltd.

(57) ABSTRACT

A method for interacting with imagery on a cellular phone, including rendering an image on a display for a cellular phone, detecting that a user has selected an active area of the display using an input device for the cellular phone, and automatically activating a function of the cellular phone corresponding to the active area of the display. A system and a computer readable storage medium are also described and claimed.

17 Claims, 11 Drawing Sheets

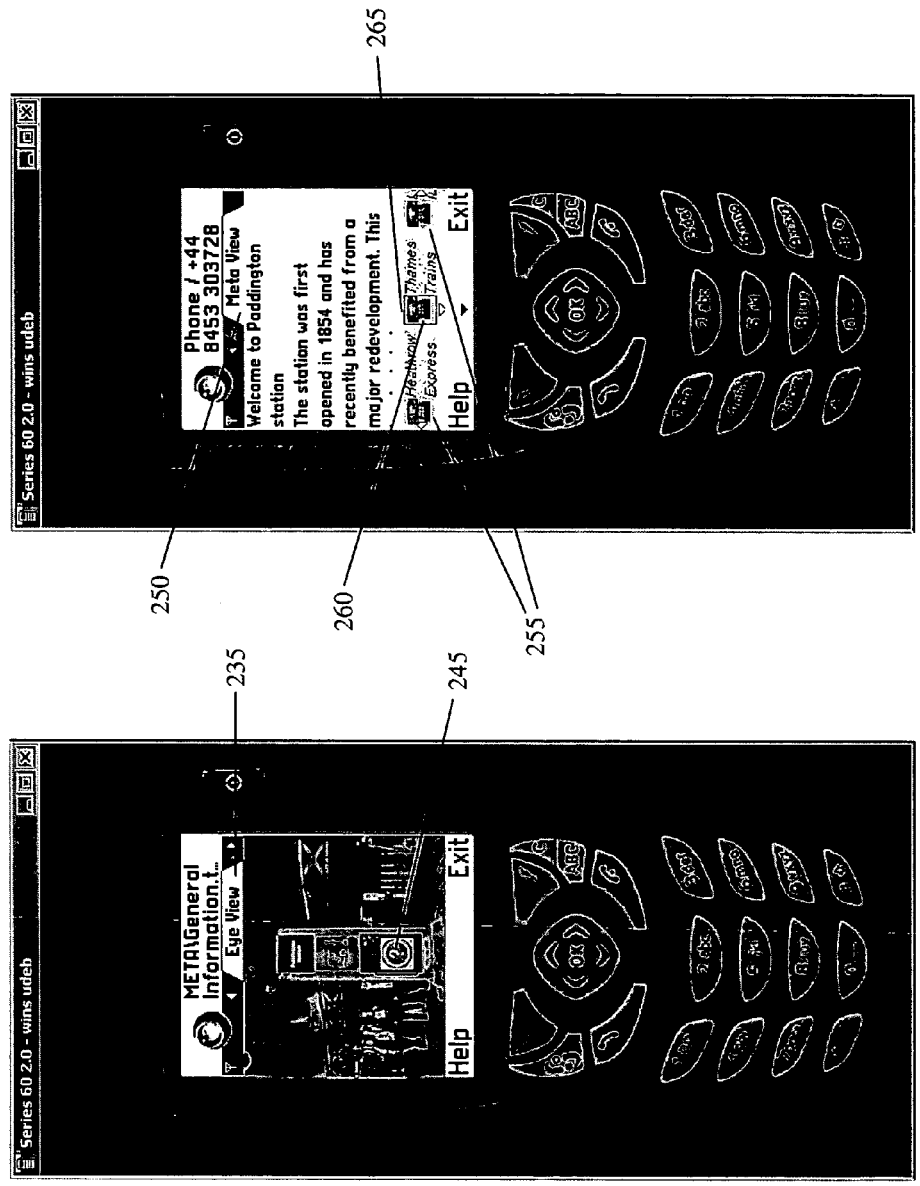

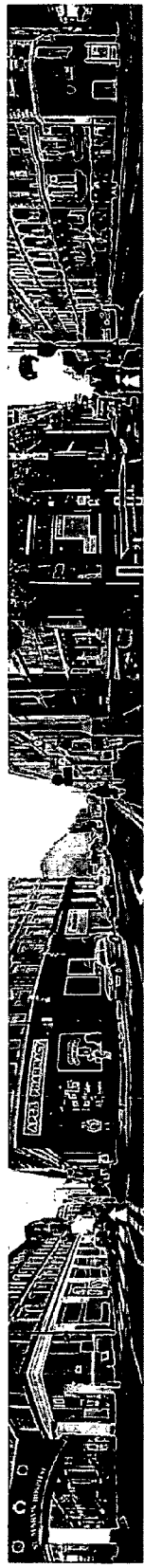
FIG. 4B
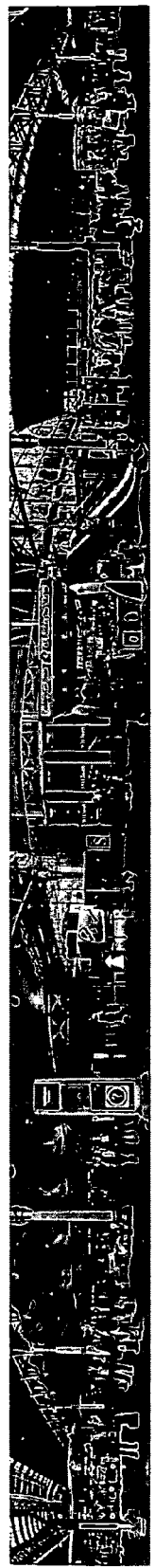
FIG. 4C
FIG. 4D

INTERACTIVE IMAGING FOR CELLULAR PHONES

FIELD OF THE INVENTION

The present invention relates to cell phones that display images.

BACKGROUND OF THE INVENTION

With the advent of color displays on cell phones, and operating systems for developing software applications, digital images are being used on cell phones in a variety of applications. Aside from the aesthetics of images, from the standpoint of information digital images convey a lot of information, much more than can be conveyed with text on the small cell phone displays. A picture's worth a thousand words. Consider, for example, a cell phone user who wishes to find directions to get from one location to another. An image of a map conveys much more information than a textual description.

Many cell phones today interact with a user with menu-driven text selections. Such an interface is cumbersome, and often involves many stages of user selection, each stage involving pressing a key or tapping a light pen. Use of images has the advantage of simplifying and accelerating the interface.

There is thus a need for an interactive imaging applications that enable a cell phone user to find the information he desires in a simple and rapid way, with an intuitive and aesthetic user interface.

SUMMARY OF THE DESCRIPTION

The present invention provides a method and system for interactive imaging on cellular phones. Using the present invention, a cell phone may run software or hardware that enables a user to interactively view virtual tours of various sites, and jump from one tour to another by means of "hot spots". Hot spots are active areas within a virtual tour that the user can activate in order to jump to a virtual tour specific to the active area. For example, the user can jump from a city map to virtual tours of sites of interest by activating hot spots for the sites that are located within the city map. Moreover, in accordance with a preferred embodiment of the present invention, hot spots can be used to automatically activate functions of the cell phone, such as a dial function. For example, a user viewing a virtual tour of a site can automatically call an office for the site by activating a hot spot within the virtual tour.

The present invention preferably provides three views within virtual tours; namely, (i) a map view, (ii) an "eye view", and (iii) a meta-view. Preferably, the map view shows an overall map for a virtual tour, enabling a user to see where the virtual tour is currently located. Preferably, the eye view shows a panoramic scene of a site located within the overall map. The eye view may also show a finer detail map of the site. Preferably, the meta view shows informational text describing the site being virtually toured. The user can toggle between these three views by pressing specific keys on the cell phone keyboard, or by tapping areas of the display with a light pen.

It may thus be appreciated that the present invention provides the capability for automatically linking functions of a cell phone to hot spots within interactive virtual tours rendered on the cell phone's display.

There is thus provided in accordance with a preferred embodiment of the present invention a method for interactive imaging on a cellular phone, including rendering an image on a display for a cellular phone, detecting that a user has selected an active area of the display using an input device for the cellular phone, and automatically activating a function of the cellular phone corresponding to the active area of the display.

There is moreover provided in accordance with a preferred embodiment of the present invention a system for interactive imaging, including a cellular phone, including a display housed on the cellular phone for displaying an image, and a processor housed inside the cellular phone and coupled to the display for detecting that a user has selected an active area of the display using an input device for the cellular phone, and for automatically activating a function of the cellular phone corresponding to the active area of the display.

There is further provided in accordance with a preferred embodiment of the present invention a computer-readable storage medium storing program code for causing a computer to perform the steps of rendering an image on a display for a cellular phone, detecting that a user has selected an active area of the display using an input device for the cellular phone, and automatically activating a function of the cellular phone corresponding to the active area of the display.

There is yet further provided in accordance with a preferred embodiment of the present invention a method for interactive imaging on a cellular phone, including determining whether or not a cellular phone is currently connected to the Internet, if so, then requesting image data from a server computer, receiving the requested image data, rendering an image on a display for the cellular phone, based on local image data stored on the cellular phone and based on the requested image data, else rendering an image on the display for a cellular phone based on local image data stored on the cellular phone, detecting that a user has selected an active area of the display using an input device for the cellular phone, and automatically activating a function of the cellular phone corresponding to the active area of the display.

There is additionally provided in accordance with a preferred embodiment of the present invention a system for interactive imaging on a cellular phone, including a cellular phone, including a connection detector housed within the cellular phone for determining whether or not the cellular phone is currently connected to the Internet, a transmitter housed within the cellular phone for requesting image data from a server computer, a receiver housed within the cellular phone for receiving the requested image data, a display on the cellular phone for displaying an image, using local image data stored on the cellular phone and using the requested image data, and a processor within said cellular phone coupled with said connection detector, said transmitter, said receiver and said display, for detecting that a user has selected an active area of the display using an input device for the cellular phone, and for automatically activating a function of the cellular phone corresponding to the active area of the display.

There is moreover provided in accordance with a preferred embodiment of the present invention a computer-readable storage medium storing program code for causing a computer to perform the steps of determining whether or not a cellular phone is currently connected to the Internet, if so, then requesting image data from a server computer, receiving the requested image data, rendering an image on a display for the cellular phone, based on local image data stored on the cellular phone and based on the requested image data, else rendering an image on the display for a cellular phone based on local image data stored on the cellular phone, detecting that a user has selected an active area of the display using an input device for the cellular phone, and automatically activating a function of the cellular phone corresponding to the active area of the display.

BRIEF DESCRIPTION OF THE DRAWINGS

The present invention will be more fully understood and appreciated from the following detailed description, taken in conjunction with the drawings in which:

FIGS. 2A-2G illustrate a virtual tour of Paddington Station displayed on a cell phone, in accordance with a preferred embodiment of the present invention;

FIGS. 4A-4D are images used to generate the virtual tour of Paddington Station, in accordance with a preferred embodiment of the present invention.

LIST OF APPENDICES

Appendices A1-A4 are source listings of XML files used to implement a system for interactive imaging, in accordance with a preferred embodiment of the present invention. Appendices B1 and B2 are source listings for an interactive imaging application that runs on cellular phones, in accordance with a preferred embodiment of the present invention.

DETAILED DESCRIPTION

The present invention concerns a method and system for interactive imaging on cellular phones.

The present invention is preferably implemented within a cell phone that includes a central processing unit, memory units for storing programs and data, a keypad and a display. Preferably, the central processing unit, memory units, and device drivers for the keypad and display are coupled communicatively together using a conventional data bus. Preferably the central processing unit runs an operating system such as Symbian OS.

FIGS. 1A-3H illustrate operation of the present invention within a Nokia cell phone.

Figures 1A, 1B:
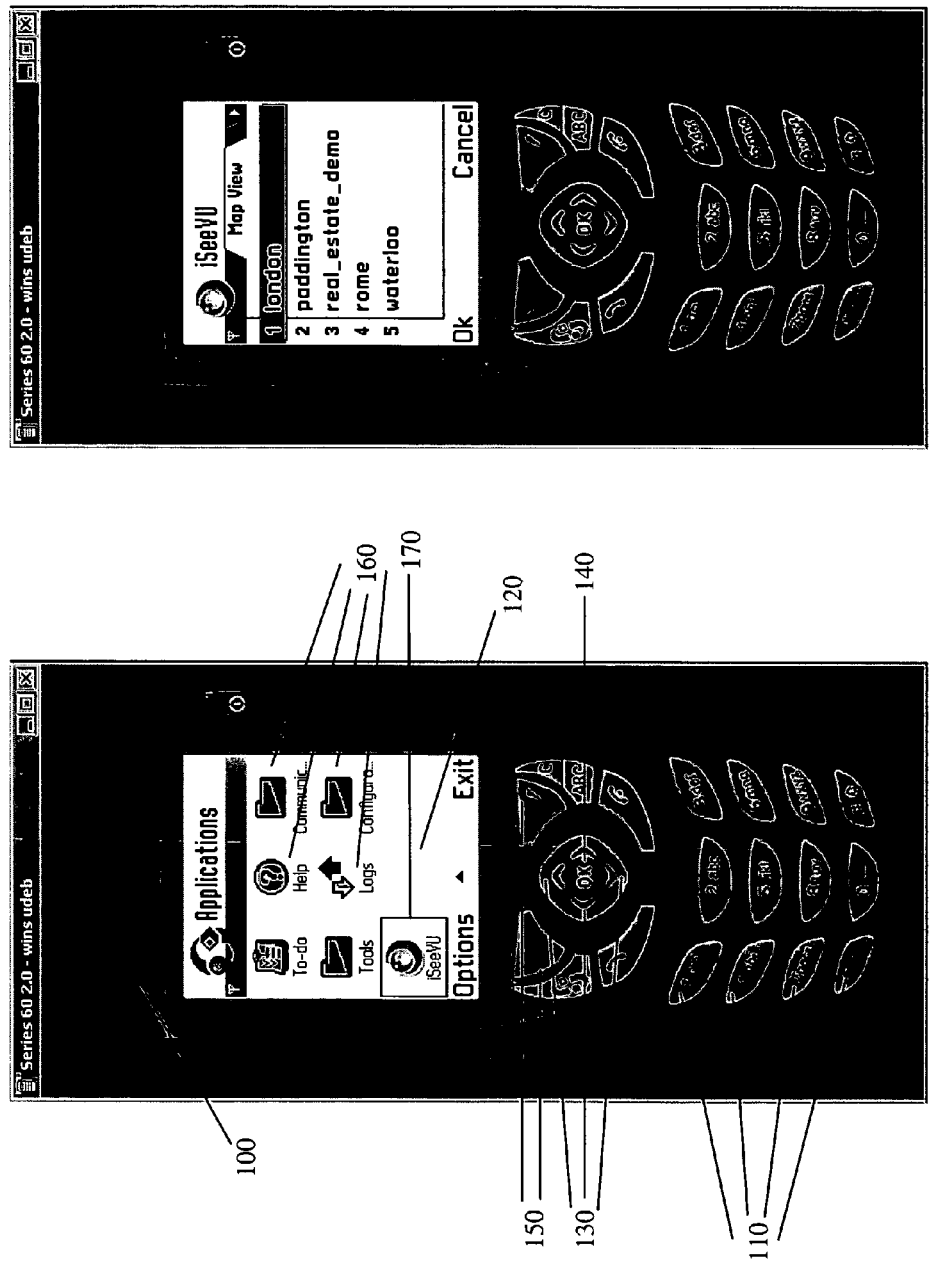
FIGS. 1A and 1B illustrate a Nokia smart cell phone running an interactive imaging application, in accordance with a preferred embodiment of the present invention.

Reference is now made to FIG. 1A, which is an illustration of a Nokia Series 60 smart cell phone 100 that includes a keypad 110, control buttons and a color display 120. Keypad 110 includes conventional buttons for the ten digits 1-0, and buttons for "*" and "#". The control buttons include four directional buttons 130, an "OK" button 140, and buttons 150 for activating the commands appearing at the bottom left and right of display 120. It may be appreciated by those skilled in the art that other input devices may be used instead of or in conjunction with keyboard 110 and buttons 130, 140 and 150, such as a light pen for tapping the screen. Such an input device is included, for example, with Sony-Ericsson cell phones.

Upon startup of cell phone 100, icons 160 for various applications loaded on the phone appear in display 130. The currently selected application is identified by a box frame 170 surrounding it. A user can navigate through the various icons by pressing directional buttons 130. The user can launch the selected application by pressing on the OK button 140.

One such icon 170 is for an interactive imaging application named "iSeeVU", in accordance with a preferred embodiment of the present invention. When iSeeVU is launched, a list of maps appear in display 120, as shown in FIG. 1B. Each map is a virtual tour of one or more sites, as described hereinbelow. The currently selected map is indicated by shaded text. The user can navigate up and down through the list of maps by pressing the up and down directional buttons 130, and can activate the currently selected map by pressing on the "OK" button.

Figures 2A, 2B:
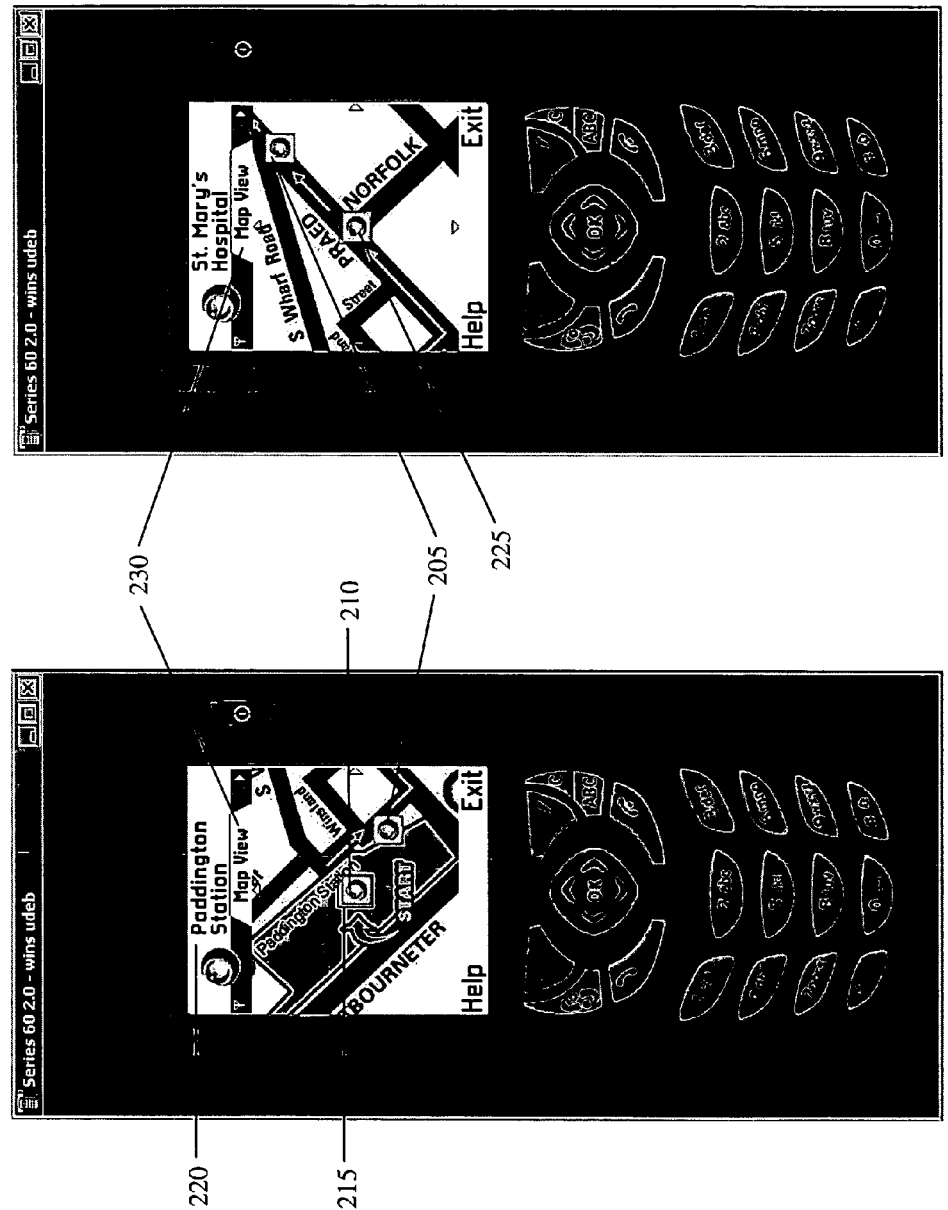

Reference is now made to FIG. 2A, which illustrates cell phone 100 with a map for a virtual tour of Paddington appearing in display 120. The Paddington map is larger than the display area of display 120, and can be moved left, right, up and down by using the four directional buttons 130.

Within the Paddington map are active areas 205 indicated by square icons, referred to as "hot spots". When a user activates a hot spot, the virtual tour jumps from one display to another, as described hereinbelow. The currently active hot spot 210 is designated by a double-lined thick border 215. For the map shown in FIG. 2A, the hot spot for Paddington Station is currently the active hot spot. This is also evidenced by the description 220 at the top of display 120. Preferably, the user navigates from one hot spot to another by pressing on the "*" key, and the user activates the currently selected hot spot by pressing on the "OK" button.

Reference is now made to FIG. 2B, which shows a different currently selected hot spot 225, described as "St. Mary's Hospital" at the top of display 120. Hot spot 225 is located at the intersection of Praed Street and Norfolk in the Paddington map.

Figures 2C, 2D:
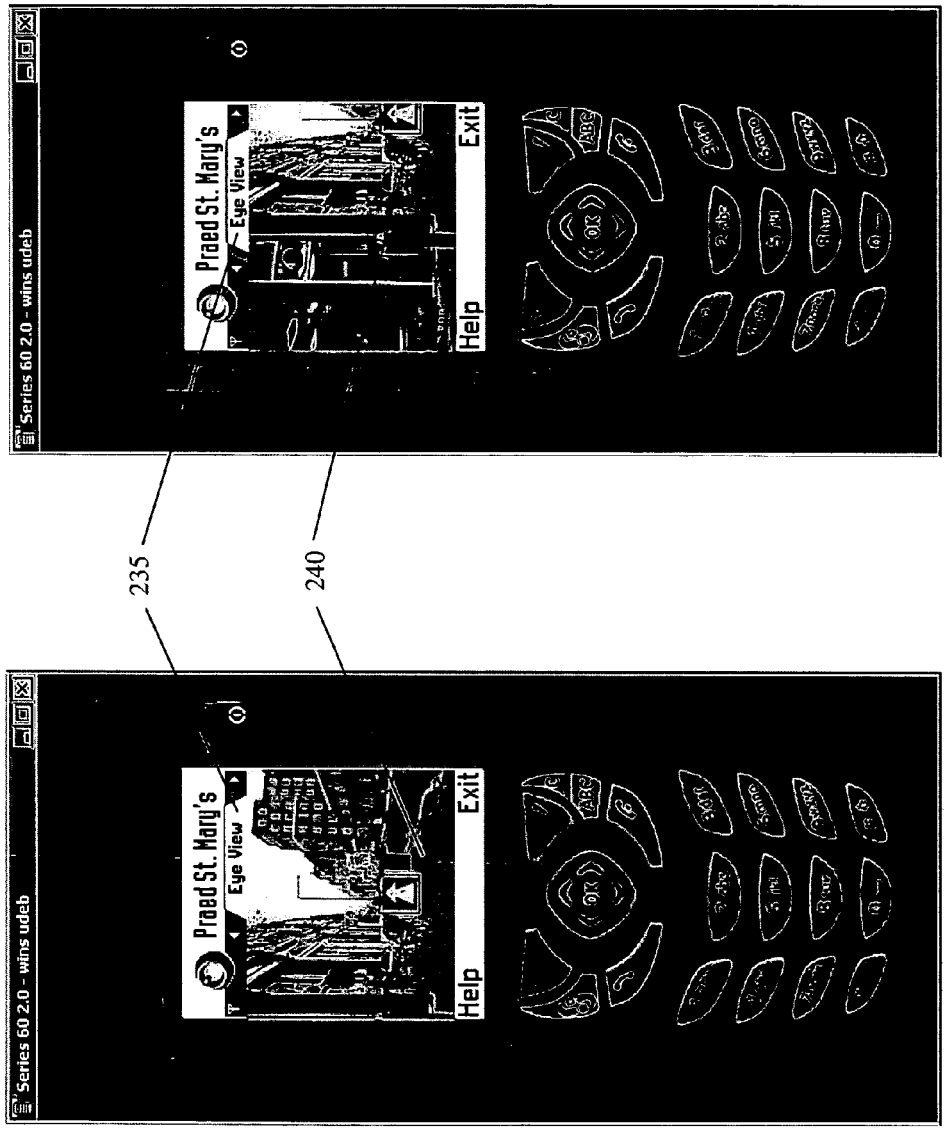

When the user activates hot spot 225, by pressing on the "OK" button, the virtual tour jumps to a panoramic scene of St. Mary's Hospital on Praed Street, as illustrated in FIG. 2C. The changeover from a map view to a panoramic scene, referred to as an "Eye View" is also indicated by the tabs 230 and 235. Preferably, the user can toggle between the map view and the panoramic scene by pressing the "1" key on keypad 110. In fact, there is a third view, referred to as a "Meta View" that the user can select, as described below with reference to FIG. 2F, and the user can toggle between all three views.

The panoramic scene of St. Mary's Hospital is larger than can fit within display 120. Preferably, the user can navigate through the panorama by pressing the directional buttons on the cell phone. Reference is made to FIG. 2D, which shows a view of St. Mary's Hospital when the user presses the left directional arrow. The distance that the panorama moves between FIG. 2C and FIG. 2D is apparent from hot spot 240. In FIG. 2C hot spot 240 is positioned near the center of display 120, and in FIG. 2D hot spot 240 has moved to the right.

Going back to Paddington Station in FIG. 2A, when the user activates hot spot 210, the virtual tour jumps to a panoramic image of Paddington Station, illustrated in FIG. 2E. Shown in FIG. 2E is a hot spot 245 described as "META/General Information" at the top of display 120. Hot spot 245 is an information hot spot. The user activates hot spot 245 and the view changes from Eye View to Meta View, as illustrated in FIG. 2F, and as indicated by tabs 235 and 250. Shown in FIG. 2F is informational text, referred to as meta-data, about Paddington Station. Below the information are telephone hot spots 255, for calling various services related to Paddington Station. Preferably, the user navigates through the telephone hot spots by pressing the "*" key. The currently selected telephone hot spot 260 is indicated by a square frame 265 surrounding it. The user activates the selected telephone hot spot by pressing on the "OK" button.

Figure 2G:
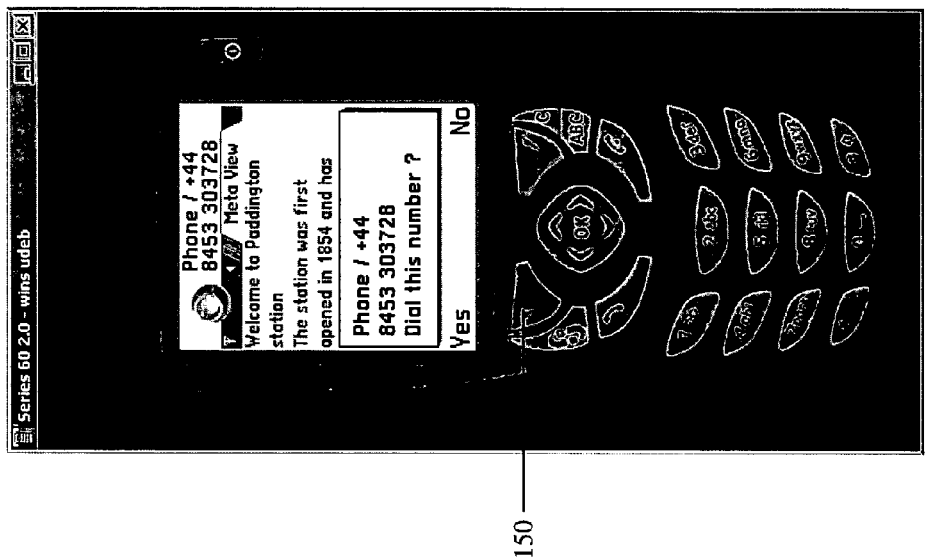

Reference is now made to FIG. 2G, which appears after the user has activated the "Thames Trains" hot spot. The phone number for the Thames Trains appears in display 120. Cell phone 100 dials the phone number automatically if the user selects "Yes", by pressing on left button 150.

Reference is now made to FIGS. 3A-3H, which illustrate a virtual tour of London. Such a virtual tour is activated when the user selects "London" from the list of maps shown in FIG. 1B, and presses the "OK" button.

Figure 3B:
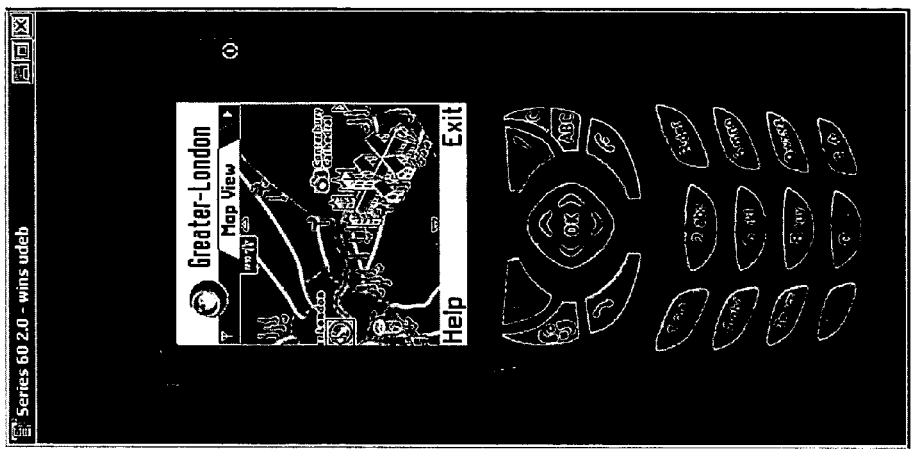
FIG. 3A-3H illustrate a virtual tour of London displayed on a cell phone, in accordance with a preferred embodiment of the present invention.
Figure 3A:
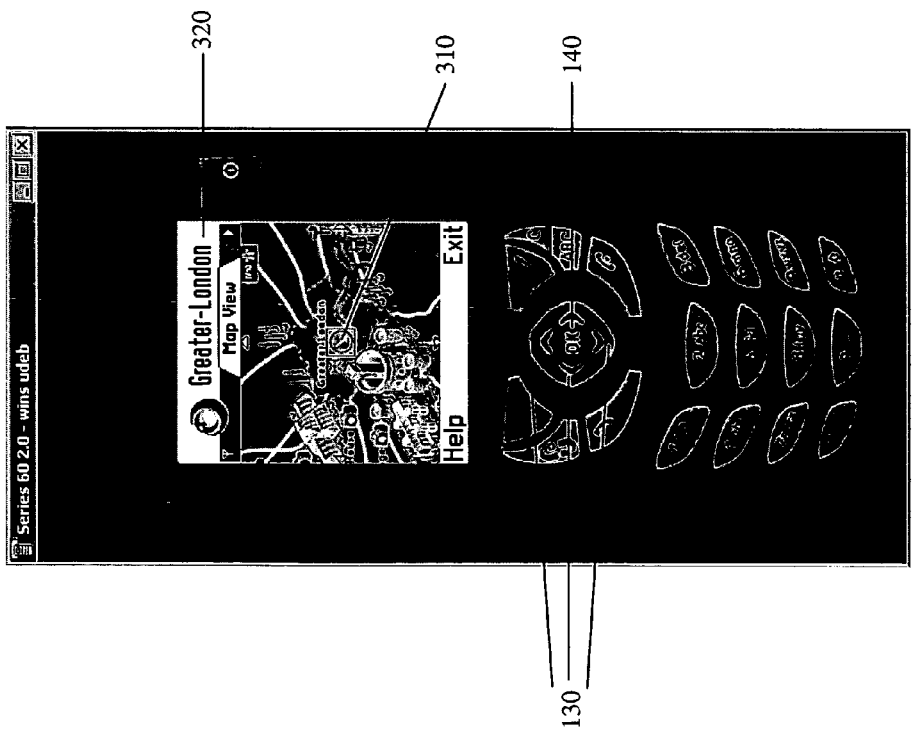

Shown in FIG. 3A is a map of London with a currently selected hot spot 310 for Greater London, as indicated in the description 320 at the top of cell phone 100. By pressing on right navigational directional button 130, the map moves to the right. The movement of the map is evident by the position of hot spot 310 in FIG. 3A vis a vis its position in FIG. 3B.

Figures 3C, 3D:
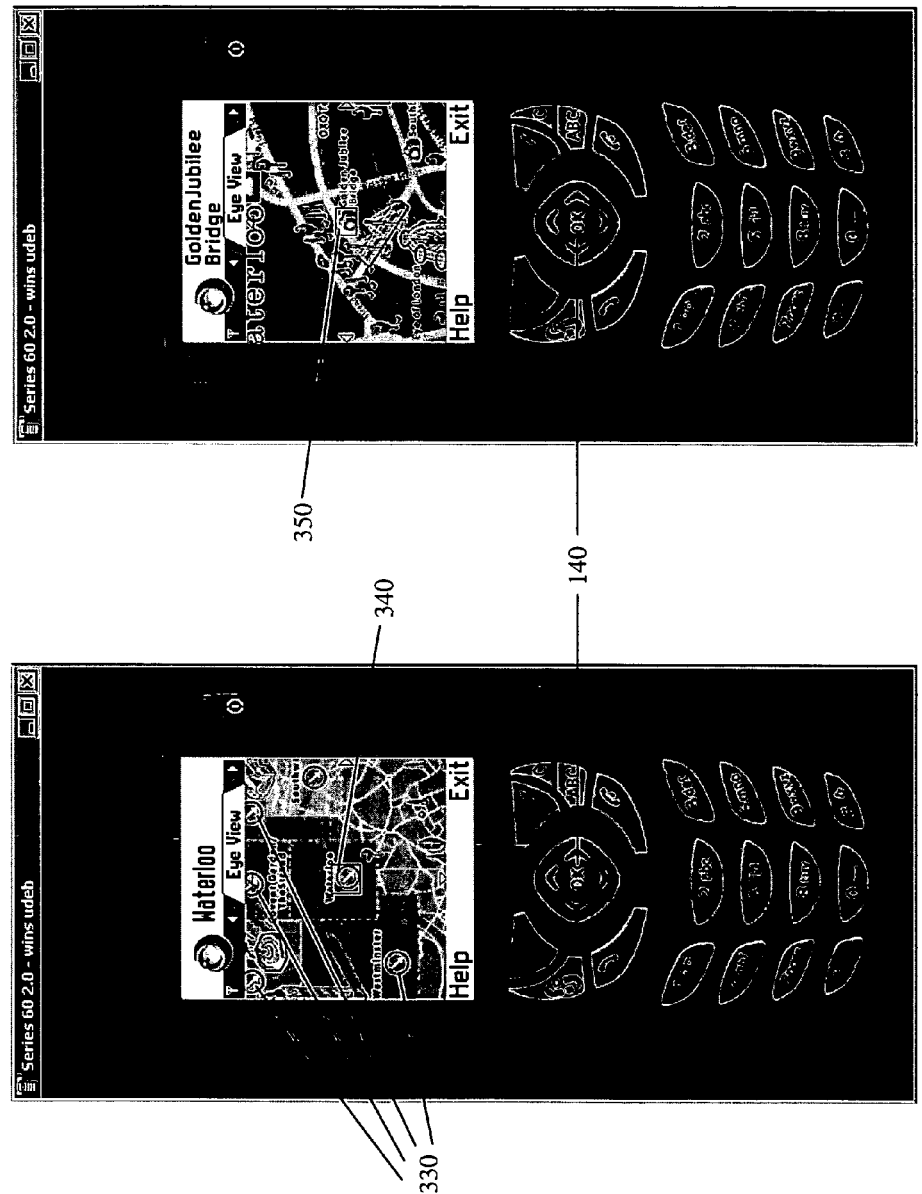

The user activates hot spot 310 by pressing on "OK" button 140, and the virtual tour jumps from a Map View of London to an Eye View of Greater London illustrated in FIG. 3C. The map in FIG. 3C contains various hot spots 330, the currently selected hotspot 340 for jumping to a map of Waterloo.

The user activates-hot spot 340 by pressing on "OK" button 140, and the virtual tour jumps from the Eye View of Greater London to an Eye View of Waterloo illustrated in FIG. 3D. In turn, the map of Waterloo contains a hot spot 350 for jumping to the Golden Jubilee Bridge.

Figures 3E, 3F:
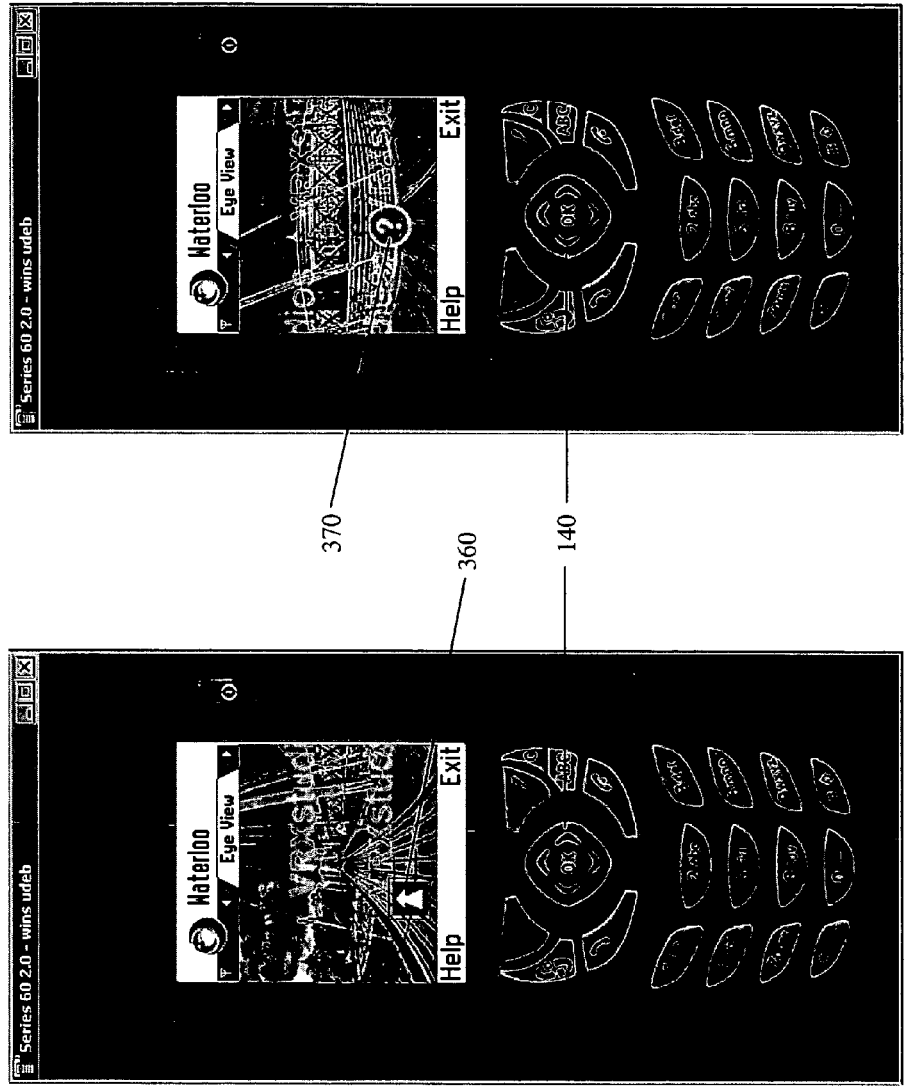
Figure 3H:
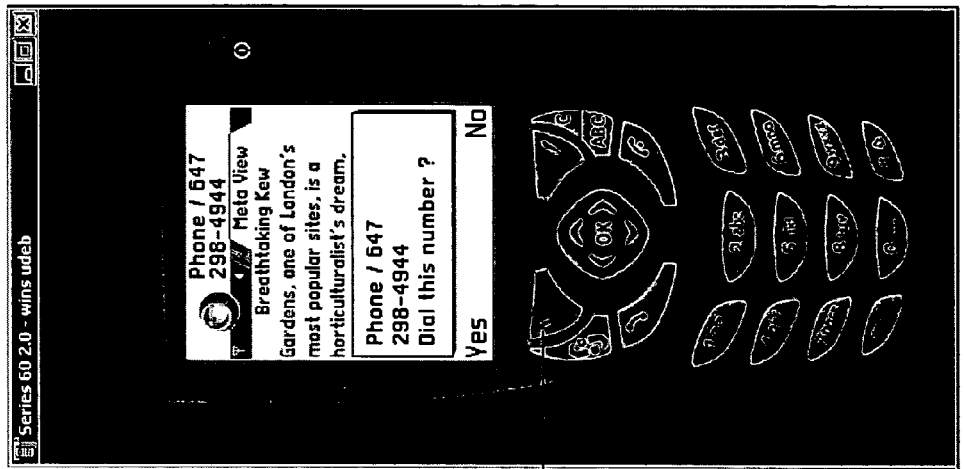

The user activates hot spot 350 by pressing on "OK" button 140, and the virtual tour jumps to a panoramic scene of the Golden Jubilee Bridge shown in FIG. 3E. The panoramic scene includes a hot spot 360 for jumping back to the Waterloo map. The user navigates through the panoramic image by pressing on directional buttons 130. The user can also move through hot spots by pressing on the "*" key. FIG. 3F shows a section of the panoramic scene that is rotated approximately 90° from the section shown in FIG. 3E, including a meta-data hot spot 370.

Figure 3G:
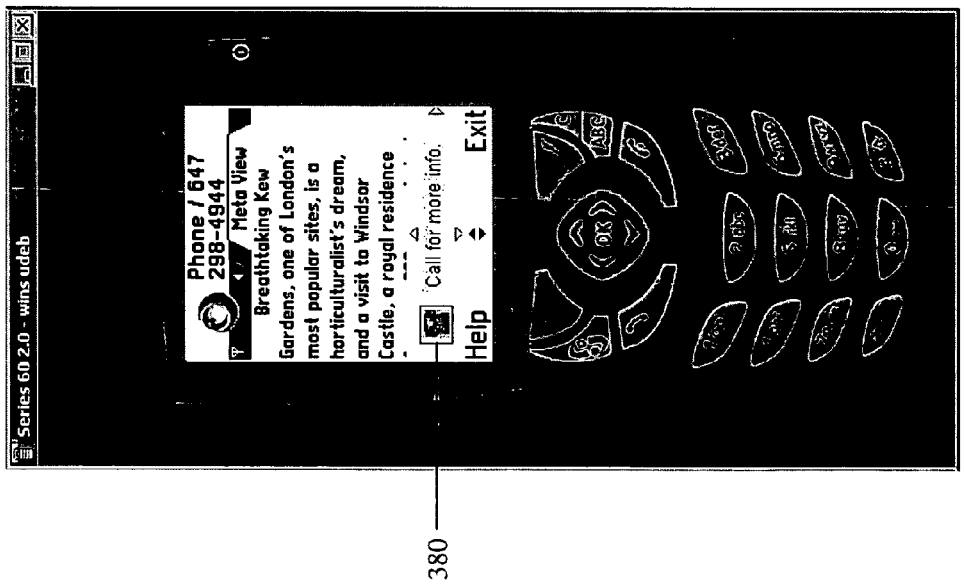

The user activates hot spot 370 by pressing on "OK" button 140, and the information text shown in FIG. 3G appears on the display. Shown in FIG. 3G is a telephone hot spot 380, which the user can activate by pressing on "OK" button 140. When the user activates hot spot 380, the phone number is displayed as in FIG. 3H, and the user selects the "Yes" command at the bottom left of the display by pressing on left button 150. In response, cell phone 100 automatically dials the indicated phone number.

Figure 4A:
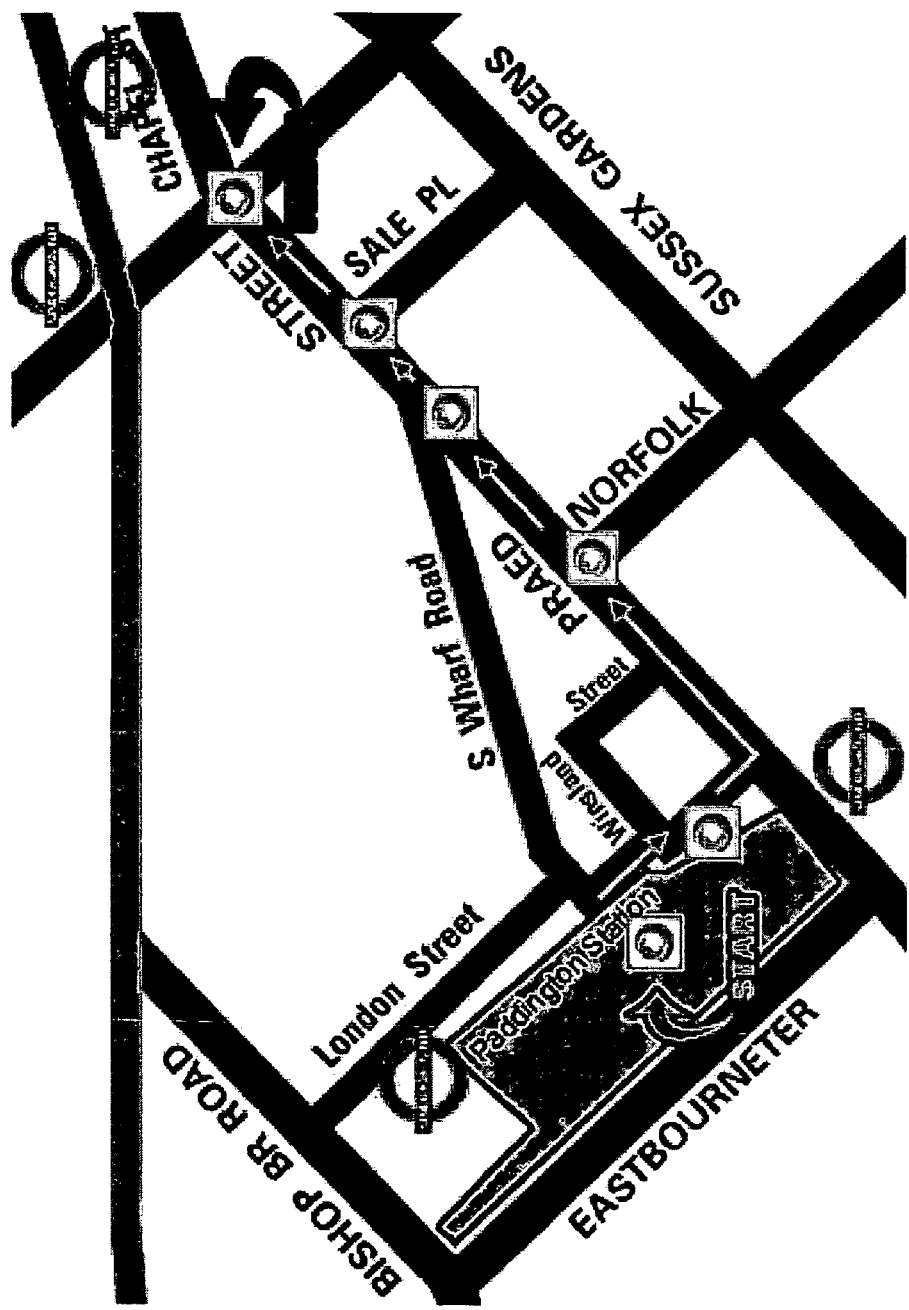

The present invention is preferably implemented through XML documents that define areas for hot spots and actions to be taken when a hot spot is activated. Reference is now made to Appendix A1, which is a listing of an XML document used to implement the virtual tour of Paddington illustrated in FIGS. 2A-2G, in accordance with a preferred embodiment of the present invention. As can be seen in the listing, an Image-File tag references a JPEG image Paddington_map.jpg, which is shown in FIG. 4A. It is noted that the image has icons for the hot spots embedded within-it.

The listing in Appendix A1 also includes a plurality of hot spots. Whenever a user presses the "*" key of the cell phone, he advances through the hot spots. Each hot spot specifies: (i) a rectangular position for the hot spot within the display, based on normalized coordinates; (ii) an XML file for the hot spot; and (iii) a tip, which includes a brief description of the hot spot. Thus the hot spot for St. Mary's Hospital extends in width from 0.558 to 0.6, and extends in height from 0.620588 to 0.679412. These coordinates are normalized so that the entire display has a width and height of 1. The hot spot for St. Mary's Hospital references an XML file named st_marys_hospital.xml, and has a tip with text "St. Mary's Hospital". Thus, when this hot spot is the currently selected hot spot, the text "St. Mary's Hospital" appears in the cell phone display, as illustrated in FIG. 2B. When this hot spot is selected by the user, the virtual tour jumps to the XML file for St. Mary's Hospital.

The XML file for St. Mary's Hospital is listed in Appendix A2, in accordance with a preferred embodiment of the present invention. The listing references a spherical panoramic image, st_marys_hospital.jpg, which is shown in FIG. 4B. The tag for the panoramic image includes several viewing parameters, such as a vertical field of view and a pitch range. The listing also references two hot spots, one for "Praed South Wharf" and one for "Praed London St". It is noted that the panoramic image has icons for the two hot spots embedded within it.

The XML file for St. Mary's Hospital is listed in Appendix A2, in accordance with a preferred embodiment of the present invention. The listing references a spherical panoramic image, st_marys_hospital.jpg, which is shown in FIG. 4B. The tag for the panoramic image includes several viewing parameters, such as a vertical field of view and a pitch range. The listing also references two hot spots, one for "Praed South Wharf" and one for Praed London St". It is noted that the panoramic image has icons for the two hot spots embedded within it.

The XML file for Paddington Station is listed in Appendix A3, in accordance with a preferred embodiment of the present invention. This file is invoked from the hot spot for Paddington Station listed in Appendix A1. The listing references a spherical panoramic image, paddington_station_interior.jpg, which is shown in FIG. 4C. The listing in Appendix A3 indicates two hot spots, one designated "Walkway to Praed St." and one designated "META/General Information.txt". The general information text file includes the text illustrated in FIG. 2F. The graphic for the telephone hot spots is shown in FIG. 4D.

The automatic dialing of the cellular phone is preferably implemented through the Symbian operating system functions call.OpenNewCall(line, newCallName) and call.Dial (aPhoneNumber), where line is an instance of Symbian class RLine, and call is an instance of Symbian class RCall.

In reading the above description, persons skilled in the art will realize that there are many apparent variations that can be applied to the methods and systems described. Thus, although the present specification describes interactive imaging for image content that is already stored in the cell phone, in an alternative embodiment the image content may be dynamically downloaded from a server computer. Specifically, when the cell phone user downloads the iSeeVU software application, illustrated in FIG. 1A, from a server computer, the download may include all of the image content, part of the image content, or none of the image content. Furthermore, when the cell phone runs the iSeeVU application, it may or may not be connected to the Internet. If the cell phone is not connected to the Internet, then it runs the iSeeVU application using whatever local content is available. If the cell phone is connected to the Internet, then it downloads content from a server, either by the cell phone pulling content on demand or by the server pushing content to the cell phone.

The ability to download content dynamically enables additional functionality, including inter alia the ability to make custom content available to users based on user profiles, and the ability to regularly change content.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims.

Accordingly, the specification and drawings are to be regarded in an illustrative rather than a restrictive sense.

APPENDIX A1

```
<?xml version="1.0" ?>
<VirtualTourLocation>
    <ImageNavigator>
        <ImageFile>PHOTOS/paddington_map.jpg</ImageFile>
        <ViewerType>J2D</ViewerType>
    </ImageNavigator>
    <Hotspot>
        <Position>0.26 0.688235 0.302 0.750035</Position>
        <XMLSource>XML/paddington_station_interior.xml</XMLSource>
        <Tip>Paddington Station</Tip>
    </Hotspot>
    <Hotspot>
        <Position>0.74 0.370588 0.78 0.432353</Position>
        <XMLSource>XML/sale_place.xml</XMLSource>
        <Tip>Sale Place</Tip>
    </Hotspot>
    <Hotspot>
        <Position>0.67 0.461765 0.712 0.523529</Position>
        <XMLSource>XML/south_wharf_road.xml</XMLSource>
        <Tip>South Wharf</Tip>
    </Hotspot>
    <Hotspot>
        <Position>0.558 0.620588 0.6 0.679412</Position>
        <XMLSource>XML/st_marys_hospital.xml</XMLSource>
        <Tip>St. Mary's Hospital</Tip>
    </Hotspot>
    <Hotspot>
        <Position>0.346 0.752941 0.388 0.814706</Position>
        <XMLSource>XML/london_street.xml</XMLSource>
        <Tip>London St</Tip>
    </Hotspot>
    <Hotspot>
        <Position>0.836 0.220588 0.878 0.282388</Position>
        <XMLSource>XML/hilton_london_metropole.xml</XMLSource>
        <Tip>Hilton London Metropole</Tip>
    </Hotspot>
</VirtualTourLocation>
```

APPENDIX A2

```
<?xml version="1.0" ?>
<VirtualTourLocation>
    <ImageNavigator>
        <ImageFile>PHOTOS/st_marys_hospital.jpg</ImageFile>
        <ViewerType>Pano</ViewerType>
        <panotype>SPHERE</panotype>
        <pitchRange>-0.231 0.231</pitchRange>
        <vFov>-0.231 0.231</vFov>
        <initialView>0.00286517 84.7636 26.4649</initialView>
        <Autospin>0</Autospin>
    </ImageNavigator>
    <Hotspot>
        <XMLSource>XML/south_wharf_road.xml</XMLSource>
        <Position>0.21572 0.730924 0.231289 0.904535</Position>
        <Tip>Praed South Wharf</Tip>
    </Hotspot>
    <Hotspot>
        <XMLSource>XML/london_street.xml</XMLSource>
        <Position>0.752424 0.823293 0.767659 0.995984</Position>
        <Tip>Praed London St</Tip>
    </Hotspot>
</VirtualTourLocation>
```

APPENDIX A3

```
<?xml version="1.0" ?>
<VirtualTourLocation>
    <ImageNavigator>
        <ImageFile>PHOTOS/paddington_station_interior.jpg</ImageFile>
        <ViewerType>Pano</ViewerType>
        <panotype>SPHERE</panotype>
        <pitchRange>-0.236 0.236</pitchRange>
        <vFov>-0.236 0.236</vFov>
        <initialView>0.00286517 148.971 27.0379</initialView>
        <Autospin>0</Autospin>
    </ImageNavigator>
    <Hotspot>
        <XMLSource>XML/london_street.xml</XMLSource>
        <Position>0.380086 0.650602 0.395028 0.817046</Position>
        <Tip>Walkway To Praed St.</Tip>
    </Hotspot>
    <Hotspot>
        <XMLSource>XML/paddington_GenInfo_meta.xml</XMLSource>
        <Position>0.292291 0.666667 0.308291 0.847667</Position>
        <Tip>META\General Information.txt</Tip>
    </Hotspot>
</VirtualTourLocation>
```

APPENDIX A4

```
<?xml version="1.0" ?>
<VirtualTourLocation>
    <ImageNavigator>
        <ImageFile>PHOTOS/paddington_GenInfo_meta.jpg</ImageFile>
        <ViewerType>J2D</ViewerType>
    </ImageNavigator>
    <Hotspot>
        <XMLSource>XML/paddington_station_interior.xml</XMLSource>
        <Position>0.0148 0.111 0.0529 0.444</Position>
        <Tip>Phone / +44 8457 484950</Tip>
    </Hotspot>
    <Hotspot>
        <XMLSource>XML/paddington_station_interior.xml</XMLSource>
        <Position>0.229 0.143 0.2682 0.461</Position>
        <Tip>Phone / +44 8456 005604</Tip>
    </Hotspot>
    <Hotspot>
        <XMLSource>XML/paddington_station_interior.xml</XMLSource>
        <Position>0.403 0.127 0.4423 0.445</Position>
        <Tip>Phone / +44 8456 001515</Tip>
    </Hotspot>
    <Hotspot>
        <XMLSource>XML/paddington_station_interior.xml</XMLSource>
        <Position>0.564 0.143 0.6032 0.461</Position>
        <Tip>Phone / +44 8453 303728</Tip>
    </Hotspot>
    <Hotspot>
        <XMLSource>XML/paddington_station_interior.xml</XMLSource>
        <Position>0.71 0.111 0.7492 0.444</Position>
        <Tip>Phone / +44 2072 620344</Tip>
    </Hotspot>
    <Hotspot>
        <XMLSource>XML/paddington_station_interior.xml</XMLSource>
        <Position>0.852 0.127 0.8914 0.445</Position>
        <Tip>Phone / +44 2072 620344</Tip>
    </Hotspot>
</VirtualTourLocation>
```

APPENDIX B1

```
const TInt KMaxPhoneLength = 0x10;
CHintController::CHintController( ):
```

APPENDIX B1-continued

```
        ipProjectManager(NULL),
        ipDrawEngine(NULL),
        ipProjectSniffler(NULL)
{
}
CHintController::~CHintController( )
{
    delete ipProjectManager;
    delete ipProjectSniffler;
    delete ipDrawEngine;
    delete iScrollTimer;
    delete iLogFile;
}
void CHintController::ConstructL( )
{
    ipProjectSniffler = CHintProjectSniffler::NewL( );
    if(!ipProjectSniffler->Sniff(KDataDirectoryC))
        if(!ipProjectSniffler->Sniff(KDataDirectoryD))
            if(!ipProjectSniffler->Sniff(KDataDirectoryE))
            {
                ShowErrorDialog(KNoContentErrorMsgLn1,
KNoContentErrorMsgLn2);
                ExitApplication( );
                return;
            }
    TFileName chosenProjDir;
    if(!ChooseProjectL(chosenProjDir))
    {
        ExitApplication( );
        return;
    }
    ipProjectManager = CHintProjectManager::NewL(chosenProjDir);
    ipProjectManager->LoadVTourL( );
    ipDrawEngine = CHintDrawEngine::NewL( );
    ipDrawEngine->SetProject(ipProjectManager);
    ipDrawEngine->SetController(this);
    iPenDown = false;
    iPenDrag = false;
    iPenUp = false;
    iScrollTimer = CPeriodic::NewL(CActive::EPriorityStandard);
    iPointerEventDown.iPosition.iX = 0;
    iPointerEventDown.iPosition.iY = 0;
    iPointerEventDrag.iPosition.iX = 0;
    iPointerEventDrag.iPosition.iY = 0;
    iPointerEventUp.iPosition.iX = 0;
    iPointerEventUp.iPosition.iY = 0;
}
TBool CHintController::ChooseProjectL(TFileName&chosenProjDir, TBool bAddCrtNb)
{
    TBool bOk = true;
    RArray<TName> projects;
    CleanupClosePushL(projects);
    ipProjectSniffler->GetProjects(projects);
    if(projects.Count( ) == 1)
    {
        ipProjectSniffler->GetProjectDir(projects[0], chosenProjDir);
        CleanupStack::PopAndDestroy( );
        return bOk;
    }
    CDesCArrayFlat* items = new(ELeave) CDesCArrayFlat(projects.Count( ));
    CleanupStack::PushL(items);
    for(int i = 0; i < projects.Count( ); i++)
    {
        TName name;
        if(bAddCrtNb)
        {
            name.AppendNum(i + 1);
            name.Append(_L("\t"));
        }
        name.Append(projects[i]);
        items->AppendL(name);
    }
    TInt nChosenProj = 0;
    if(GetUserChosenProject(nChosenProj, items))
        ipProjectSniffler->GetProjectDir(projects[nChosenProj], chosenProjDir);
    else
        bOk = false;
    items->Reset( );
    CleanupStack::PopAndDestroy( );
```

APPENDIX B1-continued

```
        CleanupStack::PopAndDestroy( );
        return bOk;
}
TKeyResponse CHintController::HandleKeyEventL(const TKeyEvent&aKeyEvent,
TEventCode aType)
{
        TKeyResponse keyResponse = EKeyWasConsumed;
        TInt active = GetActiveViewIndex( );
        TInt count = GetViewCount( );
        if(aType != EEventKey)
            return EKeyWasNotConsumed;
        TFileName metaFileName;
        ipProjectManager->GetProjectDirectory(metaFileName);
        switch (aKeyEvent.iScanCode)
        {
            case EStdKeyUpArrow:
                ipDrawEngine->ScrollUp( );
                break;
            case EStdKeyDownArrow:
                ipDrawEngine->ScrollDown( );
                break;
            case EStdKeyLeftArrow:
                ipDrawEngine->ScrollLeft( );
                break;
            case EStdKeyRightArrow:
                ipDrawEngine->ScrollRight( );
                break;
            case 49:
            case 48:
            case 51:
            {
                ipDrawEngine->ClearCache( );
                if(aKeyEvent.iScanCode == 49)
                {
                    active--;
                    active = active < 0 ? count − 1 : active;
                }
                else
                {
                    active++;
                    active = active % count;
                }
                DisplayViewNameByIndex(active);
                PrepareViewToActivate(active);
                SetActiveViewByIndex(active);
            }
                break;
            case EStdKeyNkpAsterisk:
            case 42:
            case EStdKeyHash:
            case EStdKeyNkpMinus:
                ipProjectManager->GetCrtGallery( )->inCrtHotSpot =
ipProjectManager->GetCrtGallery( )->GetNextHotSpot(aKeyEvent.iScanCode == 42 ||
aKeyEvent.iScanCode == EStdKeyNkpAsterisk);
                ShowTooltip(ipProjectManager->GetCrtGallery( )-
>GetCrtHotSpot( )->iTip);
                ipDrawEngine->Update( );
                break;
            case EStdKeyDevice3:
                if(active == 0)
                {
                    ipDrawEngine->ClearCache( );
                    CHintHotSpot* pCrtHotSpot = ipProjectManager-
>GetCrtGallery( )->GetCrtHotSpot( );
                    bool bMetaSpot = false;
                    TFileName&tip = pCrtHotSpot->iTip;
                    if(tip.Find(KMetaFileTag) != KErrNotFound)
                    {
                        bMetaSpot = true;
                        metaFileName.Append(tip);
                        MetaViewSetFileNameL(metaFileName);
                    }
                    TFileName&link = pCrtHotSpot->iLink;
                    if(!ipProjectManager->GalleryIsLoaded(link))
                    {
                        ipProjectManager->LoadVTourLocationL(link);
                        ipProjectManager->SetCrtGallery(link);
                        ipDrawEngine->ibCenterToCrtHotSpot = true;
                    }
```

APPENDIX B1-continued

```
            else
            {
                TFileName&crtGalleryName = ipProjectManager-
>GetCrtGallery( )->iXMLFileName;
                if(link != crtGalleryName)
                {
                    ipProjectManager->SetCrtGallery(link);
                    ipDrawEngine->ibCenterToCrtHotSpot = true;
                }
            }
            TInt active = 1;
            if(bMetaSpot)
                active = 2;
            DisplayViewNameByIndex(active);
            SetActiveViewByIndex(active);
        }
        else if(active == 1)
        {
            ipDrawEngine->ClearCache( );
            CHintHotSpot* pCrtHotSpot = ipProjectManager-
>GetCrtGallery( )->GetCrtHotSpot( );
            bool bMetaSpot = false;
            TFileName&tip = pCrtHotSpot->iTip;
            if(tip.Find(KMetaFileTag) != KErrNotFound)
            {
                bMetaSpot = true;
                metaFileName.Append(tip);
                MetaViewSetFileNameL(metaFileName);
            }
            TFileName&link = pCrtHotSpot->iLink;
            if(!ipProjectManager->GalleryIsLoaded(link))
            {
                ipProjectManager->LoadVTourLocationL(link);
                ipProjectManager->SetCrtGallery(link);
                ipDrawEngine->ibCenterToCrtHotSpot = true;
                if(!bMetaSpot)
                    ipDrawEngine->Update( );
            }
            else
            {
                TFileName&crtGalleryName = ipProjectManager-
>GetCrtGallery( )->iXMLFileName;
                if(link != crtGalleryName)
                {
                    ipProjectManager->SetCrtGallery(link);
                    ipDrawEngine->ibCenterToCrtHotSpot = true;
                    if(!bMetaSpot)
                    ipDrawEngine->Update( );
                }
                else
                {
                    keyResponse = EKeyWasNotConsumed;
                }
            }
            if(bMetaSpot)
            {
                active = 2;
                SetActiveViewByIndex(active);
            }
        }
        else if( active == 2 )
        {
            CHintHotSpot* pCrtHotSpot = ipProjectManager-
>GetCrtGallery( )->GetCrtHotSpot( );
            TFileName&tip = pCrtHotSpot->iTip;
            TInt pos = tip.Find(KMetaPhoneTag);
            if(pos != KErrNotFound)
            {
                pos += KMetaPhoneTag( ).Length( );
                TInt phoneNbLength = tip.Length( ) – pos;
                TBuf<KMaxPhoneLength> buf;
                buf = tip.Right(phoneNbLength);
                if(!ConfirmDialog(tip, KDialConfMsg))
                    break;
                TRAPD(err, DialNumberL(buf); );
                if (err)
                    User::InfoPrint(_L("Error dialing"));
                break;
            }
```

APPENDIX B1-continued

```
                else if(tip.Find(KMetaEmailTag) != KErrNotFound)
                    {
                        break;
                    }
            }
        default:
            keyResponse = EKeyWasNotConsumed;
        }
    return keyResponse;
}
void CHintController::PrepareViewToActivate(TInt active)
{
    if(active == 0)
    {
        HBufC* locationName = HBufC::NewLC(ipProjectManager-
>GetCrtGallery( )->iXMLFileName.Length( ));
        *locationName = ipProjectManager->GetCrtGallery( )->iXMLFileName;
        TFileName map;
        ipProjectManager->GetStartupLocation(map);
        if(!ipProjectManager->GalleryIsLoaded(map))
        {
            ipProjectManager->LoadVTourLocationL(map);
            ipProjectManager->SetCrtGallery(map);
            ipDrawEngine->ibCenterToCrtHotSpot = true;
        }
        else
        {
            ipProjectManager->SetCrtGallery(map);
            ipDrawEngine->ibCenterToCrtHotSpot = true;
        }
        ipProjectManager->GetCrtGallery( )-
>SetCurrentHotSpotByLink(*locationName);
        CleanupStack::PopAndDestroy(locationName);
    }
    else if(active == 1)
    {
        CHintHotSpot* pCrtHotSpot = ipProjectManager->GetCrtGallery( )-
>GetCrtHotSpot( );
        TFileName&link = pCrtHotSpot->iLink;
        if(!ipProjectManager->GalleryIsLoaded(link))
        {
            ipProjectManager->LoadVTourLocationL(link);
            ipProjectManager->SetCrtGallery(link);
            ipDrawEngine->ibCenterToCrtHotSpot = true;
        }
        else
        {
            ipProjectManager->SetCrtGallery(link);
            ipDrawEngine->ibCenterToCrtHotSpot = true;
        }
    }
    else if(active == 2)
    {
        CHintHotSpot* pCrtHotSpot = ipProjectManager->GetCrtGallery( )-
>GetCrtHotSpot( );
        TFileName&tip = pCrtHotSpot->iTip;
        TFileName&link = pCrtHotSpot->iLink;
        TFileName metaFileName;
        ipProjectManager->GetProjectDirectory(metaFileName);
        metaFileName.Append(tip);
        MetaViewSetFileNameL(metaFileName);
        MetaViewUseDrawEngine(tip.Find(KMetaFileTag) != KErrNotFound);
        if(!ipProjectManager->GalleryIsLoaded(link))
        {
            ipProjectManager->LoadVTourLocationL(link);
            ipProjectManager->SetCrtGallery(link);
            ipDrawEngine->ibCenterToCrtHotSpot = true;
        }
        else
        {
            ipProjectManager->SetCrtGallery(link);
            ipDrawEngine->ibCenterToCrtHotSpot = true;
        }
    }
}
void CHintController::HandlePointerEventL(const TPointerEvent&aPointerEvent)
{
    switch(aPointerEvent.iType)
    {
```

APPENDIX B1-continued

```
            case TPointerEvent::EButton1Down:
                iPenDown = true;
                iPenDrag = false;
                iPointerEventDown = aPointerEvent;
                iPointerEventDrag = aPointerEvent;
                break;
            case TPointerEvent::EDrag:
                if(!iPenDown)
                    return;.
                iPenDrag = true;
                {
                    TStdScanCode direction =
CheckPenDragDirection(iPointerEventDrag, aPointerEvent);
                    switch (direction)
                    {
                        case EStdKeyUpArrow:
                            ipDrawEngine->ScrollDown( );
                            break;
                        case EStdKeyDownArrow:
                            ipDrawEngine->ScrollUp( );
                            break;
                        case EStdKeyLeftArrow:
                            ipDrawEngine->ScrollRight( );
                            break;
                        case EStdKeyRightArrow:
                            ipDrawEngine->ScrollLeft( );
                            break;
                        default:
                            iPenDrag = false;
                    }
                }
                iPointerEventDrag = aPointerEvent;
                break;
            case TPointerEvent::EButton1Up:
                if(iPenDrag &&iScrollTimer &&iScrollTimer->IsActive( ))
                    iScrollTimer->Cancel( );
                if(!iPenDrag)
                {
                    TPoint imagePos(0,0);
                    ipDrawEngine->ImagePosFromScreenPos(imagePos,
aPointerEvent.iPosition);
                    TInt nTappedSpot = ipProjectManager->GetCrtGallery( )-
>GetHotSpotFromPos(imagePos);
                    if(nTappedSpot != -1)
                    {
                        ipProjectManager->GetCrtGallery( )->inCrtHotSpot =
nTappedSpot;
                        ShowTooltip(ipProjectManager->GetCrtGallery( )-
>GetCrtHotSpot( )->iTip);
                        ipDrawEngine->ibCenterToCrtHotSpot = false;
                        ipDrawEngine->Update( );
                        TKeyEvent aKeyEvent = {0};
                        aKeyEvent.iScanCode = EStdKeyDevice3;
                        TEventCode aType;
                        aType = EEventKey;
                        HandleKeyEventL(aKeyEvent, aType);
                    }
                }
                iPenDown = false;
                iPenDrag = false;
                iPointerEventUp = aPointerEvent;
                iPointerEventDrag.iPosition.iX = 0;
                iPointerEventDrag.iPosition.iY = 0;
                break;
            default:
                {
                    TInt dummy = 1;
                    dummy++;
                }
        }
    }
}
void CHintController::HandleUserTabSwitchEventL( )
{
    if(ipDrawEngine)
        ipDrawEngine->ClearCache( );
    TInt index = GetActiveViewIndex( );
    PrepareViewToActivate(index);
    SetActiveViewByIndex(index);
}
```

APPENDIX B1-continued

```
TInt CHintController::ScrollTimerCallBack(TAny*)
{
    return 0;
}
TStdScanCode CHintController::CheckPenDragDirection(const TPointerEvent&
aPointerEventDrag1, const TPointerEvent&aPointerEventDrag2)
{
    TStdScanCode direction = EStdKeyNull;
    TPoint delta = aPointerEventDrag2.iPosition – aPointerEventDrag1.iPosition;
    if(delta.iX == 0 &&delta.iY == 0)
    {
        direction = EStdKeyNull;
    }
    else if(delta.iX >= 0 &&delta.iY >= 0)
    {
        if(delta.iX > delta.iY)
            direction = EStdKeyRightArrow;
        else
            direction = EStdKeyDownArrow;
    }
    else if(delta.iX >= 0 &&delta.iY <= 0)
    {
        delta.iY = –delta.iY;
        if(delta.iX > delta.iY)
            direction = EStdKeyRightArrow;
        else
            direction = EStdKeyUpArrow;
    }
    else if(delta.iX <= 0 &&delta.iY <= 0)
    {
        delta.iX = –delta.iX;
        delta.iY = –delta.iY;
        if(delta.iX > delta.iY)
            direction = EStdKeyLeftArrow;
        else
            direction = EStdKeyUpArrow;
    }
    else if(delta.iX <= 0 &&delta.iY >= 0)
    {
        delta.iX = –delta.iX;
        if(delta.iX > delta.iY)
            direction = EStdKeyLeftArrow;
        else
            direction = EStdKeyDownArrow;
    }
    return direction;
}
void CHintController::DialNumberL(const TDesC&aPhoneNumber)
{
    RTelServer server;
    CleanupClosePushL(server);
    User::LeaveIfError(server.Connect( ));
    TName tsy;
    User::LeaveIfError(server.GetTsyName(0, tsy));
    User::LeaveIfError(server.LoadPhoneModule(tsy));
    TInt numberPhones;
    User::LeaveIfError(server.EnumeratePhones(numberPhones));
    if (numberPhones < 1)
        User::Leave(KErrNotFound);
        RTelServer::TPhoneInfo info;
        User::LeaveIfError(server.GetPhoneInfo(0, info));
    RPhone phone;
    CleanupClosePushL(phone);
    User::LeaveIfError(phone.Open(server, info.iName));
    RPhone::TLineInfo lineInfo;
    User::LeaveIfError(phone.GetLineInfo(0, lineInfo));
    RLine line;
    CleanupClosePushL(line);
    User::LeaveIfError(line.Open(phone, lineInfo.iName));
    TBuf <100> newCallName;
    RCall call;
    CleanupClosePushL(call);
    User::LeaveIfError(call.OpenNewCall(line, newCallName));
    User::LeaveIfError(call.Dial(aPhoneNumber));
    CleanupStack::PopAndDestroy(3);
    User::LeaveIfError(server.UnloadPhoneModule(tsy));
    CleanupStack::PopAndDestroy(&server);
}
```

APPENDIX B2

```
const TInt KScrollStep = 20;
const TInt KScrollArrow = 5;
CHintDrawEngine* CHintDrawEngine::NewL( )
{
    CHintDrawEngine* self = CHintDrawEngine::NewLC( );
    CleanupStack::Pop( );
    return self;
}
CHintDrawEngine* CHintDrawEngine::NewLC( )
{
    CHintDrawEngine* self = new (ELeave) CHintDrawEngine( );
    CleanupStack::PushL(self);
    self->ConstructL( );
    return self;
}
void CHintDrawEngine::ConstructL( )
{
    ipProjectManager = NULL;
    ipDisplayCallback = NULL;
    ipController = NULL;
    ipArrImages = new (ELeave) CArrayPtrFlat<CHintImageAdapter> (1);
}
CHintDrawEngine::CHintDrawEngine( ):
    iClientRect(0,0,0,0)
{
    iCrtImage = -1;
    iMaxCachedAdapters = 1;
    iTopLeft.iX = 0;
    iTopLeft.iY = 0;
    ibMarkHotSpots = false;
    ibCenterToCrtHotSpot = true;
    ibScrollUpBtn = false;
    ibScrollDownBtn = false;
    ibScrollLeftBtn = false;
    ibScrollRightBtn = false;
}
CHintDrawEngine::~CHintDrawEngine( )
{
    ipProjectManager = NULL;
    ipDisplayCallback = NULL;
    ipController = NULL;
    if (ipArrImages)
    {
        for(TInt idx = 0; idx < ipArrImages->Count( ); ++idx)
            ipArrImages->At(idx)->Cancel( );
        ipArrImages->ResetAndDestroy( );
        delete ipArrImages;
        ipArrImages = NULL;
    }
}
void CHintDrawEngine::ClearCache( )
{
    if (ipArrImages)
    {
        for(TInt idx = 0; idx < ipArrImages->Count( ); ++idx)
            ipArrImages->At(idx)->Cancel( );
        ipArrImages->ResetAndDestroy( );
        delete ipArrImages;
        ipArrImages = NULL;
    }
    iCrtImage = -1;
    ipArrImages = new (ELeave) CArrayPtrFlat<CHintImageAdapter> (1);
}
void CHintDrawEngine::SetProject(CHintProjectManager* apHintProjectManager)
{
    ipProjectManager = apHintProjectManager;
}
void CHintDrawEngine::SetController(MHintController* apController)
{
    ipController = apController;
}
void CHintDrawEngine::Update( )
{
    CHintImageNavigator* pCrtImageNav = ipProjectManager->GetCrtImgNav( );
    TFileName crtImageName = pCrtImageNav->iImageFileName;
    TInt idx = 0;
    for(idx = 0; idx < ipArrImages->Count( ); ++idx)
    {
        if(crtImageName == ipArrImages->At(idx)->GetImageFileName( ))
```

APPENDIX B2-continued

```
            break;
        }
    }
    if(idx == ipArrImages->Count( ))
    {
        CHintImageAdapter* pImageAdapter = NULL;
        pImageAdapter =
CHintImageAdapter::NewLC(NEikonEnvironment::EikEnv( ).DefaultDisplayMode( ));
        pImageAdapter->SetImageFileName(crtImageName);
        pImageAdapter->SetDispCallback(ipDisplayCallback);
        pImageAdapter->SetEngCallback(this);
        pImageAdapter->ExecuteCommandL(EDecodeImage);
        ipArrImages->AppendL(pImageAdapter);
        CleanupStack::Pop(pImageAdapter);
        iCrtImage = idx;
    }
    else
    {
        iCrtImage = idx;
        CheckScrollers( );
        if(ibCenterToCrtHotSpot)
            CenterToCrtHotSpot( );
        if(ipDisplayCallback)
            ipDisplayCallback->Redraw( );
    }
}
void CHintDrawEngine::CenterToCrtHotSpot( )
{
    CHintHotSpot* pSpot = NULL;
    pSpot = ipProjectManager->GetCrtGallery( )->GetCrtHotSpot( );
    iTopLeft.iX = iClientRect.iTl.iX + iClientRect.Width( )/2 - (pSpot->iX + pSpot-
>iWidth / 2);
    iTopLeft.iY = iClientRect.iTl.iY + iClientRect.Height( )/2 - (pSpot->iY + pSpot-
>iHeight / 2);
    CFbsBitmap* bitmap = &(ipArrImages->At(iCrtImage)->Image( ));
    TInt nBitmapHeight = bitmap->SizeInPixels( ).iHeight;
    if(iTopLeft.iY <= iClientRect.iTl.iY + iClientRect.Height( ) - nBitmapHeight)
        iTopLeft.iY = iClientRect.iTl.iY + iClientRect.Height( ) - nBitmapHeight;
    if(iTopLeft.iY >= iClientRect.iTl.iY)
        iTopLeft.iY = iClientRect.iTl.iY;
    TInt nBitmapWidth = bitmap->SizeInPixels( ).iWidth;
    if(iTopLeft.iX <= iClientRect.iTl.iX + iClientRect.Width( ) - nBitmapWidth)
        iTopLeft.iX = iClientRect.iTl.iX + iClientRect.Width( ) - nBitmapWidth;
    if(iTopLeft.iX >= iClientRect.iTl.iX)
        iTopLeft.iX = iClientRect.iTl.iX;
}
void CHintDrawEngine::SystemRedraw( )
{
    if(ipDisplayCallback)
        ipDisplayCallback->Redraw( );
}
void CHintDrawEngine::ImageReady( )
{
    NormalizeHotSpots(iCrtImage);
    CenterToCrtHotSpot( );
    CheckScrollers( );
    ipController->ImageReady( );
    if(ipDisplayCallback)
        ipDisplayCallback->Redraw( );
}
void CHintDrawEngine::SetDisplayReference(MDisplayCallback* apDisplayRef)
{
    ipDisplayCallback = apDisplayRef;
    if(ipDisplayCallback)
    {
        ipDisplayCallback->GetWindowClientRect(iClientRect);
        TopLeft = iClientRect.iTl;
    }
}
void CHintDrawEngine::Draw(CWindowGc&gc, const TRect&) const
{
    if(iCrtImage == -1)
        return;
    if(ipArrImages->At(iCrtImage)->GetErr( ) != KErrNone)
        return;
    if(!ipArrImages->At(iCrtImage)->ImageLoaded( ))
    {
        return;
    }
    CFbsBitmap* bitmap = &(ipArrImages->At(iCrtImage)->Image( ));
```

APPENDIX B2-continued

```
        TBool bUseVirtualTl = false;
        if(ipProjectManager->GetCrtImgNav( )->iViewerType == 1)
        {
                if(iTopLeft.iX > iClientRect.iTl.iX)
                {
                        TPoint virtTopLeft(iTopLeft.iX - bitmap->SizeInPixels( ).iWidth,
iTopLeft.iY);
                        gc.BitBlt(virtTopLeft, bitmap);
                        bUseVirtualTl = true;
                }
                gc.BitBlt(iTopLeft, bitmap);
        }
        else
                gc.BitBlt(iTopLeft, bitmap);
        CHintHotSpot* pSpot = NULL;
        gc.SetPenColor(KRgbRed);
        if(ibMarkHotSpots)
        {
                for(TInt idx = 0; idx < ipProjectManager->GetCrtGallery( )-
>ipArrHotSpots->Count( ); ++idx)
                {
                        pSpot = ipProjectManager->GetCrtGallery( )->ipArrHotSpots-
>At(idx);
                        gc.DrawRect( TRect( iTopLeft + TPoint(pSpot->iX, pSpot->iY),
TSize(pSpot->iWidth, pSpot->iHeight) ) );
                        if(bUseVirtualTl)
                        {
                                TPoint virtTopLeft(iTopLeft.iX - bitmap-
>SizeInPixels( ).iWidth, iTopLeft.iY);
                                gc.DrawRect( TRect( virtTopLeft + TPoint(pSpot->iX, pSpot-
>iY), TSize(pSpot->iWidth, pSpot->iHeight) ) );
                        }
                }
        }
        pSpot = ipProjectManager->GetCrtGallery( )->GetCrtHotSpot( );
        gc.DrawRect( TRect( iTopLeft + TPoint(pSpot->iX - 2, pSpot->iY - 2),
TSize(pSpot->iWidth + 4, pSpot->iHeight + 4) ) );
        DrawScrollers(gc);
}
void CHintDrawEngine::ScrollUp( )
{
        if(iTopLeft.iY == iClientRect.iTl.iY)
                return;
        iTopLeft.iY += KScrollStep;
        if(iTopLeft.iY >= iClientRect.iTl.iY)
                iTopLeft.iY = iClientRect.iTl.iY;
        CheckScrollers( );
        SystemRedraw( );
}
void CHintDrawEngine::ScrollDown( )
{
        CFbsBitmap* bitmap = &(ipArrImages->At(iCrtImage)->Image( ));
        TInt nBitmapHeight = bitmap->SizeInPixels( ).iHeight;
        if(iTopLeft.iY == iClientRect.iTl.iY + iClientRect.Height( ) - nBitmapHeight)
                return;
        iTopLeft.iY -= KScrollStep;
        if(iTopLeft.iY <= iClientRect.iTl.iY + iClientRect.Height( ) - nBitmapHeight)
                iTopLeft.iY = iClientRect.iTl.iY + iClientRect.Height( ) - nBitmapHeight;
        CheckScrollers( );
        SystemRedraw( );
}
void CHintDrawEngine::ScrollLeft( )
{
        if(ipProjectManager->GetCrtImgNav( )->iViewerType == 1)
        {
                iTopLeft.iX += KScrollStep;
                if(iTopLeft.iX >= iClientRect.Width( ))
                {
                        CFbsBitmap* bitmap = &(ipArrImages->At(iCrtImage)->Image( ));
                        TInt nBitmapWidth = bitmap->SizeInPixels( ).iWidth;
                        iTopLeft.iX = iClientRect.Width( ) - nBitmapWidth;
                }
        }
        else
        {
                if(iTopLeft.iX == iClientRect.iTl.iX)
                        return;
                iTopLeft.iX += KScrollStep;
                if(iTopLeft.iX >= iClientRect.iTl.iX)
```

APPENDIX B2-continued

```
            iTopLeft.iX = iClientRect.iTl.iX;
        }
        CheckScrollers( );
        SystemRedraw( );
}
void CHintDrawEngine::ScrollRight( )
{
        CFbsBitmap* bitmap = &(ipArrImages->At(iCrtImage)->Image( ));
        TInt nBitmapWidth = bitmap->SizeInPixels( ).iWidth;
        if(ipProjectManager->GetCrtImgNav( )->iViewerType == 1)
        {
            iTopLeft.iX -= KScrollStep;
            if(iTopLeft.iX <= iClientRect.Width( ) - nBitmapWidth)
            {
                iTopLeft.iX = iClientRect.Width( );
            }
        }
        else
        {
            if(iTopLeft.iX == iClientRect.iTl.iX + iClientRect.Width( ) - nBitmapWidth)
                return;
            iTopLeft.iX -= KScrollStep;
            if(iTopLeft.iX <= iClientRect.iTl.iX + iClientRect.Width( ) - nBitmapWidth)
                iTopLeft.iX = iClientRect.iTl.iX + iClientRect.Width( ) -
nBitmapWidth;
        }
        CheckScrollers( );
        SystemRedraw( );
}
void CHintDrawEngine::NormalizeHotSpots(TInt aCrtImage)
{
        CFbsBitmap* bitmap = &(ipArrImages->At(aCrtImage)->Image( ));
        TInt nBitmapWidth = bitmap->SizeInPixels( ).iWidth;
        TInt nBitmapHeight = bitmap->SizeInPixels( ).iHeight;
        if(!nBitmapWidth || !nBitmapHeight)
        {
            ASSERT(false);
            return;
        }
        CHintHotSpot* pSpot = NULL;
        for(TInt idx = 0; idx < ipProjectManager->GetCrtGallery( )->ipArrHotSpots-
>Count( ); ++idx)
        {
            pSpot = ipProjectManager->GetCrtGallery( )->ipArrHotSpots->At(idx);
            pSpot->iX = TInt(nBitmapWidth * pSpot->iXsReal);
            pSpot->iY = TInt(nBitmapHeight * pSpot->iYsReal);
            pSpot->iWidth = TInt(nBitmapWidth * (pSpot->iXeReal - pSpot-
>iXsReal));
            pSpot->iHeight = TInt(nBitmapHeight * (pSpot->iYeReal - pSpot-
>iYsReal));
        }
        ipProjectManager->GetCrtGallery( )->SortTheSpots( );
}
void CHintDrawEngine::SetMarkHotSpots(TBool abMarkThem)
{
        ibMarkHotSpots = abMarkThem;
}
void CHintDrawEngine::CheckScrollers( )
{
        CFbsBitmap* pBitmap = &(ipArrImages->At(iCrtImage)->Image( ));
        if(!pBitmap)
            return;
        ibScrollUpBtn = (iTopLeft.iY < iClientRect.iTl.iY);
        ibScrollDownBtn = (iTopLeft.iY + pBitmap->SizeInPixels( ).iHeight >
iClientRect.iBr.iY);
        ibScrollLeftBtn = (iTopLeft.iX < iClientRect.iTl.iX);
        ibScrollRightBtn = (iTopLeft.iX + pBitmap->SizeInPixels( ).iWidth >
iClientRect.iBr.iX);
        if(ipProjectManager->GetCrtImgNav( )->iViewerType == 1)
        {
            ibScrollLeftBtn = false;
            ibScrollRightBtn = false;
        }
}
void CHintDrawEngine::DrawScrollers(CWindowGc&gc) const
{
        TPoint ptOrig = TPoint(iClientRect.iTl.iX, iClientRect.iTl.iY);
        TInt width = iClientRect.Width( );
        TInt height = iClientRect.Height( );
```

APPENDIX B2-continued

```
    TInt arrow = KScrollArrow;
    if(ibScrollLeftBtn)
    {
        gc.DrawLine(ptOrig + TPoint(0, height/2), ptOrig + TPoint(arrow, height/2
– arrow));
        gc.DrawLine(ptOrig + TPoint(0, height/2), ptOrig + TPoint(arrow, height/2
+ arrow));
        gc.DrawLine(ptOrig + TPoint(arrow, height/2 – arrow), ptOrig +
TPoint(arrow, height/2 + arrow));
    }
    if(ibScrollRightBtn)
    {
        gc.DrawLine(ptOrig + TPoint(width – arrow, height/2 – arrow), ptOrig +
TPoint(width, height/2));
        gc.DrawLine(ptOrig + TPoint(width – arrow, height/2 + arrow), ptOrig +
TPoint(width, height/2));
        gc.DrawLine(ptOrig + TPoint(width – arrow, height/2 – arrow), ptOrig +
TPoint(width – arrow, height/2 + arrow));
    }
    if(ibScrollUpBtn)
    {
        gc.DrawLine(ptOrig + TPoint(width/2 – arrow, arrow), ptOrig +
TPoint(width/2, 0));
        gc.DrawLine(ptOrig + TPoint(width/2, 0), ptOrig + TPoint(width/2 +
arrow, arrow));
        gc.DrawLine(ptOrig + TPoint(width/2 – arrow, arrow), ptOrig +
TPoint(width/2 + arrow, arrow));
    }
    if(ibScrollDownBtn)
    {
        gc.DrawLine(ptOrig + TPoint(width/2 – arrow, height – arrow), ptOrig +
TPoint(width/2, height));
        gc.DrawLine(ptOrig + TPoint(width/2, height), ptOrig + TPoint(width/2 +
arrow, height – arrow));
        gc.DrawLine(ptOrig + TPoint(width/2 – arrow, height – arrow), ptOrig +
TPoint(width/2 + arrow, height – arrow));
    }
}
void CHintDrawEngine::ImagePosFromScreenPos(TPoint&aImagePos, const TPoint&
aScreenPos)
{
    aImagePos = aScreenPos – iTopLeft;
    if(iTopLeft.iX > iClientRect.iTl.iX &&aScreenPos.iX < iTopLeft.iX)
    {
        CFbsBitmap* bitmap = &(ipArrImages->At(iCrtImage)->Image( ));
        TPoint virtTopLeft(iTopLeft.iX – bitmap->SizeInPixels( ).iWidth,
iTopLeft.iY);
        aImagePos = aScreenPos – virtTopLeft;
    }
}
```

What is claimed is:

1. A method for interactive imaging on a cellular phone, comprising:

rendering (i) a map view of a designated geographical map on a display screen of a cellular phone, the map view comprising:

(i.a) an image of the designated geographical map; and (i.b) site hot spots for at least one site within the designated geographical map;

rendering (ii) a site view of a designated site on the display screen of the cellular phone, the site view comprising:

(ii.a) an image of the designated, site;

(ii.b) a map hot spot for a geographical map that includes the designated, site;

(ii.c) site hot spots for at least one site located within the designated site or for a site that includes the designated site therewithin; and (ii.d) meta hot spots for information about at least one site within the designated site;

rendering (iii) a meta view of a designated site on the display screen of the cellular phone, the meta view comprising:

(iii.a) information about the designated, site;

(iii.b) a site hot spot for a site view of the designated site; and (iii.c) telephone hot spots for at least one telephone number of the designated site, wherein map hot spots are triggers for said rendering a map view, site hot spots are triggers for said rendering a site view, meta hot spots are triggers for said rendering a meta view, and telephone hot spots are triggers for automatically dialing phone numbers on the cellular phone.

2. The method of claim 1 wherein said rendering a map view is interactively navigable, by use of directional buttons on the cellular phone, to display images of different portions of the designated geographical map.

3. The method of claim 1 wherein said rendering a site view comprises rendering a panoramic scene of the designated site, and wherein said rendering a panoramic scene is interactively navigable, by use of directional buttons on the cellular phone, to display images of different portions of the panoramic scene.

4. The method of claim 1 further comprising downloading the images of the designated geographical map and the designated site from a remote server computer.

5. The method of claim 1 further comprising:
   determining whether or not the cellular phone is currently connected to the Internet;
   if so, then downloading the images of the designated geographical map and the designated site from a remote server computer; and
   if not, then using local images stored in the cellular phone for the images of the designated geographical map and the designated site.

6. The method of claim 1 further comprising toggling between said rendering a map view, said rendering a site view and said rendering a meta view in response to button presses on a keypad of the cellular phone.

7. The method of claim 1 further comprising advancing though hot spots in the map view, advancing though hot spots in the site view, and advancing though hot spots in the meta view, in response to button presses on a keypad of the cellular phone.

8. The method of claim 1 wherein the site view and the meta view include back hot spots for returning back to a previously rendered view.

9. A system for interactive imaging, comprising:
   a cellular phone, comprising:
   a display screen housed on said cellular phone for displaying an image;
   a processor housed inside said cellular phone and coupled to said display for
   rendering (i) a map view of a designated geographical map on said display screen, the map view comprising:
   (i.a) an image of the designated geographical map, and
   (i.b) site hot spots for at least one site within the designated map;
   rendering (ii) a site view of a designated site on said display screen, the site view comprising:
   (ii.a) an image of the designated site;
   (ii.b) a map hot spot for a geographical map that includes the designated site;
   (ii.c) site hot spots for at least one site located within the designated site and for a site that includes the designated site therewithin; and
   (ii.d) meta hot spots for information about at least one site within the designated site;
   rendering (iii) a meta view of a designated site on said display screen, the meta view comprising:
   (iii.a) information about the designated site;
   (iii.b) a site hot spot for a site view of the designated site; and
   (iii.c) telephone hot spots for at least one telephone number of the designated site; and
   processing activation of hot spots whereby map hot spots are triggers for rendering a map view, site hot spots are triggers for rendering a site view, meta hot spots are triggers for rendering a meta view, and telephone hot spots are triggers for automatically dialing phone numbers on said cellular phone.

10. The system of claim 9 wherein said cellular phone further comprises directional buttons, and wherein said processor renders a map view that is interactively navigable, by use of said directional buttons, to display images of different portions of the designated geographical map on said display screen.

11. The system of claim 9 wherein said cellular phone further comprises directional buttons, and wherein said processor renders a site view as a panoramic scene of the designated site, the panoramic scene being interactively navigable, by use of said directional buttons, to display images of different portions of the panoramic scene on said display screen.

12. The system of claim 9 further comprising a downloader for downloading the images of the designated geographical map and the designated site from a remote server computer.

13. The system of claim 9 wherein said cellular phone further comprises:
   a storage memory for storing images; and
   a downloader for downloading images from a remote server computer, and wherein said processor determines whether or not the cellular phone is currently connected to the Internet, and:
   if so, then downloading the images of the designated geographical map and the designated site from the remote server computer by said downloader; and
   if not, then using local images stored in said storage memory for the images of the designated geographical map and the designated site.

14. The system of claim 9 wherein said cellular phone further comprises a keypad, and wherein said processor toggles between rendering a map view, rendering a site view and rendering a meta view in response to button presses on said keypad.

15. The system of claim 9 wherein said cellular phone further comprises a keypad, and wherein said processor advances though hot spots in the map view, advances though hot spots in the site view, and advances though hot spots in the meta view, in response to button presses on said keypad.

16. The system of claim 9 wherein the site view and the meta view include back hot spots, activation of which causes said processor to return to a previously rendered view.

17. A computer-readable storage medium storing program code for causing a computer:
   to render (i) a map view of a designated geographical map on a display screen of a cellular phone, the map view comprising:
   (i.a) an image of the designated geographical map; and
   (i.b) site hot spots for at least one site within the designated geographical map;
   to render (ii) a site view of a designated site on the display screen of the cellular phone, the site view comprising:
   (ii.a) an image of the designated site;
   (ii.b) a map hot spot for a geographical map that includes the designated site;
   (ii.c) site hot spots for at least one site located within the designated site or for a site that includes the designated site therewithin; and
   (ii.d) meta hot spots for information about at least one site within the designated site; and
   to render (iii) a meta view of a designated site on the display screen of the cellular phone, the meta view comprising:
   (iii.a) information about the designated site;
   (iii.b) a site hot spot for a site view of the designated site; and
   (iii.c) telephone hot spots for at least one telephone number of the designated site,
   wherein map hot spots are triggers for rendering a map view, site hot spots are triggers for rendering a site view, meta hot spots are triggers for rendering a meta view, and telephone hot spots are triggers for automatically dialing phone numbers on the cellular phone.

* * * * *